US011958167B2

(12) United States Patent
Gleeson

(10) Patent No.: US 11,958,167 B2
(45) Date of Patent: Apr. 16, 2024

(54) MODULAR VISE SYSTEM AND METHODS OF USING SAME

(71) Applicant: Torin Gleeson, York, NY (US)

(72) Inventor: Torin Gleeson, York, NY (US)

( * ) Notice: Subject to any disclaimer, the term of this patent is extended or adjusted under 35 U.S.C. 154(b) by 0 days.

(21) Appl. No.: 17/690,914

(22) Filed: Mar. 9, 2022

(65) Prior Publication Data

US 2022/0288747 A1 Sep. 15, 2022

Related U.S. Application Data

(60) Provisional application No. 63/158,573, filed on Mar. 9, 2021.

(51) Int. Cl.

*B25B 1/10* (2006.01)
*B25B 1/08* (2006.01)
*B25B 1/24* (2006.01)
*B25B 5/08* (2006.01)

(52) U.S. Cl.

CPC .................. *B25B 1/10* (2013.01); *B25B 1/08* (2013.01); *B25B 1/2463* (2013.01); *B25B 5/08* (2013.01)

(58) Field of Classification Search

CPC .......... B25B 1/08; B25B 1/2463; B25B 1/02; B25B 1/2484; B25B 1/103; B25B 1/2489; B25B 1/24; B25B 1/2405; B25B 1/2421; B25B 5/08; B25B 11/00; B23Q 3/02; B23Q 3/06; B23Q 3/061; B23Q 3/066; B23Q 3/102; B23Q 37/005

USPC ....... 269/86, 266, 289 R, 291, 900, 100, 99, 269/81, 69

See application file for complete search history.

(56) References Cited

U.S. PATENT DOCUMENTS 2,564,138 A * 8/1951 Walker ...................... B25B 1/24 269/95
4,046,364 A * 9/1977 Coope .................. B25B 1/2484 269/244
4,101,119 A * 7/1978 Speiser ................ B25B 1/2489 269/203
4,489,924 A * 12/1984 McDougal ............... B23Q 1/28 269/23
4,867,621 A * 9/1989 Morghen ............... B23Q 3/108 409/218

(Continued)

FOREIGN PATENT DOCUMENTS

TW 1716315 B * 2/2021

OTHER PUBLICATIONS

TW-I716315-B_translated_description (Year: 2021).*

*Primary Examiner* — Tyrone V Hall, Jr.
*Assistant Examiner* — Jacob Adam Montgomery
(74) *Attorney, Agent, or Firm* — Bassett IP Strategies; David F. Bassett

(57) ABSTRACT

The present invention provides a modular vise system comprised of a fixed body, a moveable body, and a fixture plate, wherein the moveable body has a wide range of motion which enables it to grab a piece of any size that will fit within the confines of the fixture plate, the moveable body being tightened from the top of the modular vise. Tightening of the modular vise from the top allows for multiple work pieces to be placed along the moving axis of the modular vise which increases workpiece density and machine efficiency. The moveable body of the modular vise may be driven mechanically, electrically, or via a fluid driven actuator such as a pneumatic actuator or a hydraulic actuator.

18 Claims, 15 Drawing Sheets

(56) References Cited

U.S. PATENT DOCUMENTS

| | | | | | |
|---|---|---|---|---|---|
| 5,060,920 | A * | 10/1991 | Engibarov | B25B 1/241 | 269/282 |
| 5,735,513 | A * | 4/1998 | Toffolon | B25B 1/08 | 269/154 |
| 6,126,158 | A * | 10/2000 | Engibarov | B25B 5/08 | 269/157 |
| 2003/0197319 | A1* | 10/2003 | Ho | B25B 1/08 | 269/246 |
| 2014/0353898 | A1* | 12/2014 | Hofmann | B25B 5/10 | 269/225 |
| 2020/0156218 | A1* | 5/2020 | Chang | B25B 1/2478 | |

* cited by examiner

120

320

MODULAR VISE SYSTEM AND METHODS OF USING SAME

FIELD OF THE INVENTION

The present invention relates to the field of machine tool vise units and particularly to modular vise units.

BACKGROUND OF THE INVENTION

There exist many methods and systems for work holding during machining operations, one of the most common and versatile methods of work holding is clamping the work piece within a vise that is mounted to the working surface of the machine tool. The current art of work holding has limitation in that the space occupied by the vise or vise system is generally much larger than the workpiece itself, creating a situation of low part density on the machine tool work surface, oftentimes referred to as a machining table or simply as a table, resulting in inefficient usage of the machine tool.

The current work holding standard, "Kurt" style milling vises, manufactured by Kurt Workholding of Minneapolis, Minnesota, suffer from the main problem that the vise body is necessarily larger than the largest workpiece the vise can clamp. When the vise is clamping a smaller workpiece the rest of the vise body is wasted space upon the machine tool working surface. Further issues with this style vise are the methods of tightening the vise, affixing jaws to the vise, and positioning the vise on the table. Tightening of the vise occurs from the front i.e. along the clamping axis of the vise, as opposed to from the top of the vise. This limits the user from arranging multiple vises along their respective clamping axes, further limiting the number of parts that can be arranged on any given work surface. Attaching jaws to this style vise is accomplished solely by two countersunk socket head cap screws (SHCS) in oversized holes to allow ease of fitment. This method of attaching jaws lacks any precision locating features, eliminating any positional repeatability when removing and replacing a set of jaws. Attachment of the vise body itself to the machine tool work surface is generally accomplished by toe clamps or directly bolting through oversized holes in the vise body; both methods require precision alignment to the machine tool during fitment which slows the pace of changeover set up. Another problem with the standard Kurt style vise is the movable jaw motion is not accurately constrained and a phenomenon known as "jaw lift" can result from tightening the vise on a part. This jaw lift creates an unknown change in part height off the machine tool working surface resulting in inaccurate part positioning.

There exist vises that tighten by wrenching from the top, such as those made by Gerardi SPA of Milan Italy, however these vises utilize a ramp type clamping action, limiting the range of motion. These vises also incorporate a large fixed base that wastes space when only clamping a small size or quantity of parts.

Fixture clamps, such as many of those produced by Mitee Bite Products LLC of Ossipee New Hampshire, provide a very low profile, top wrenching solution, allowing for very high work piece density. Fixture clamps such as this however have a very limited range of motion, requiring a special fixture plate to be made for each distinct work piece to be machined. Furthermore while fixture clamps such as this provide good part density for primary machining operations, they do not provide reliable means for locating a second machining operation such as a soft jaw cut to the negative of the machined part such as can be obtained with a vise and jaw system.

One vise system that is truly modular is provided by Tosa Tool of Staughton Wisconsin. This system enables the user to place a vise body anywhere on a fixture plate, with enough range of motion to clamp any sized part within the confines of the fixture plate. This system must be tightened from the front, along the clamping axis of the vise, similar to the "Kurt" style vises. This, as mentioned, limits the work piece density significantly and is a major drawback.

The present invention overcomes all the limitations listed providing a modular vise with a wide range of motion, a small footprint upon the work surface, and allowing for precise alignment upon the work surface; all of which provide a machinist efficient work surface usage and quick changeovers with a non-customized machine tool vise as will be demonstrated in the description of the invention. The modular vise may further be used in tandem with additional vises further optimizing workpiece density and machine efficiency.

SUMMARY OF THE INVENTION

As depicted in FIG. 1, the object of the present invention is to provide a modular vise system 100 comprised of a fixed body 110, a moveable body 120, and a fixture plate 190, wherein the moveable body 120 has a wide range of motion which enables it to grab a piece of any size that will fit within the confines of the fixture plate 190, the moveable body 120 being tightened from the top of the modular vise 100. Tightening of the modular vise 100 from the top allows for multiple work pieces to be placed along the moving axis of the modular vise 100 which increases workpiece density on the table and therefore machine efficiency. The moveable body 110 further contains a means for mounting including at least one and preferably two or more holes 134 to facilitate bolting or clamping to the fixture plate as well as at least one and preferably two or more locating features to precisely align the moveable body 110 with the fixture plate 190. The at least one hole 134 is preferably counterbored at the top to allow flush bolting with SHCS. The at least one hole 134 is also counterbored on the bottom with tight tolerance holes 136 to allow placement of hollow alignment dowels that match up with corresponding counterbored holes 192 in the fixture plate 190 allow for rapid precision placement of either vise body which in turn allows for rapid changeovers and machine setups. The fixture plate 190 provides the means for attaching the modular vise to the table.

The modular vise system 100 of the present invention further allows for the movable body 120 of the modular vise system 100 to be used as a second mounting point for another vise jaw, which enables the movable body 120 to act as a fixed body for a second modular vise, further increasing workpiece density and machine efficiency. As will be readily apparent to those skilled in the art, the movable body of the second modular vise may then function as a fixed body for a third modular vise and likewise may each successive movable body from a modular vise be used as a fixed body to hold a part with an additional vise.

The modular vise system of the present invention may be actuated through a variety of means such as mechanically, electrically, or via a fluid driven actuator such as a pneumatic actuator, a hydraulic actuator, or the like.

BRIEF DESCRIPTION OF THE DRAWINGS

Embodiments of the present invention will be described by reference to the following drawings, in which like numerals refer to like elements, and in which:

FIG. 11 is a view of an alternative dovetail grip intended for directly clamping a part with an embodiment of the present invention; and.

LIST of PARTS

Figure 1:
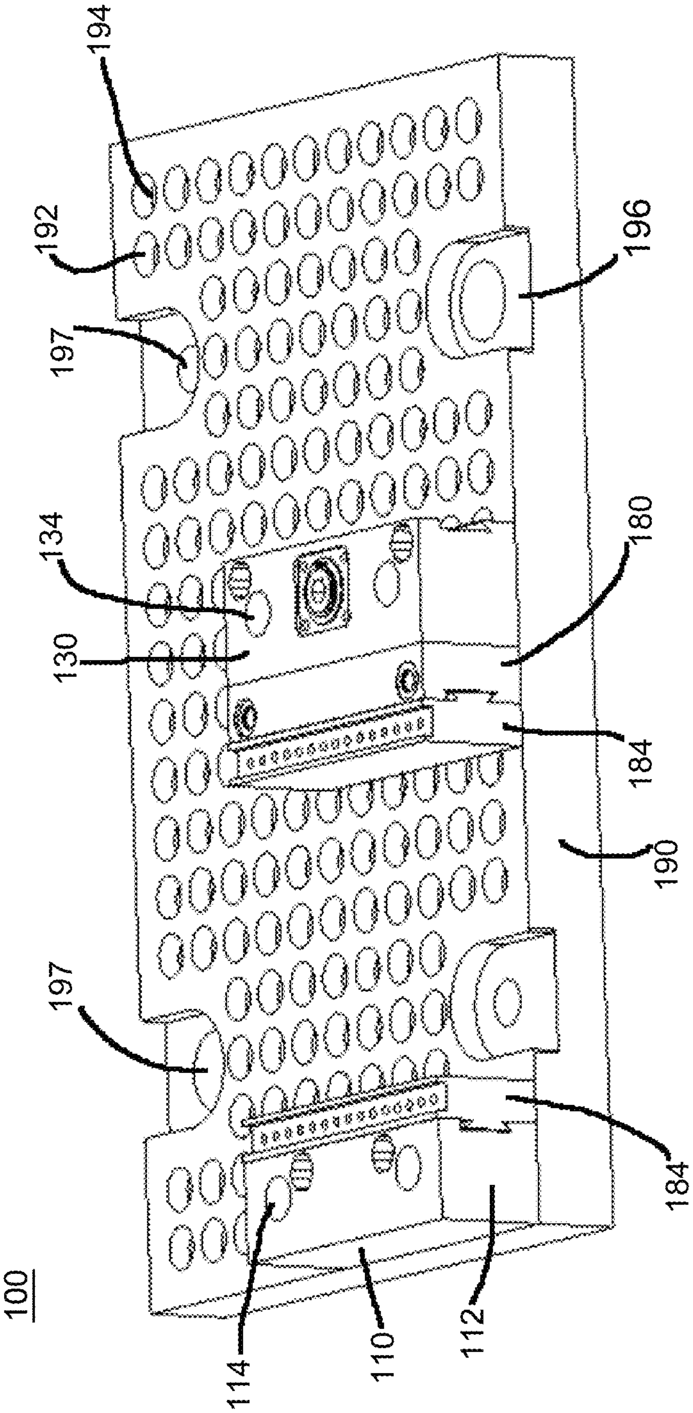
FIG. 1 is an isometric view of an exemplary modular vise of the present invention.

The following is a listing of parts presented in the drawings wherein like part numbers indicate like parts:

100-modular vise system;
110-fixed body;
112-dovetail groove;
114-counterbore for fastener;
120-moveable body;
130-stationary block;
132-dovetail groove;
134-stationary block bore for fixture plate alignment dowel;
136-stationary block bore for fixture plate mounting;
137-fixture plate tight tolerance mounting dowel;
140-bevel gear set;
141-bevel gear set housing bore;
142-bevel gear set housing;
143-driven gear retaining ring;
144-drive bevel gear;
145-driven bevel gear;
146-bevel gear driving feature;
147-drive gear retaining ring;
148-thrust washers;
149-means for bevel gear set housing mounting;
150-lead screw;
160-guide rods;
162-guide rod bore;
164-guide rod mounting bolt;
170-dovetail clamps;
171-jaw alignment dowel bore hole;
172-jaw alignment dowels;
175-dovetail clamp bore hole;
176-countersunk socket head cap screw (SHCS);
178-chamfered edged tooth;
180-master jaw;
184-vise jaw;
185-channel;
187-double dove tail;
188-mounting holes
190-fixture plate;
192-fixture plate mounting bore hole;
194-fixture plate alignment dowel mounting bore hole;
196-counterbored cutout for clamp mounting to machine working surface;
197-fixture plate clamping bores;
220-moveable body for modular vise with hydraulic or pneumatic actuation;
230-stationary block;
232-dovetail groove;
237-drive fluid inlet;
238-drive fluid outlet;
260-guide rods/pistons;
262-guide rod housing;
263-O-rings;
264-seal housing (seal pack);
266-socket head cap screw (SHCS);
320-moveable body for modular vise with electric actuation;
330-stationary block;
350-electric motor;
362-guide rod bore;
370-part clamping dove tail grip;
384-part stop;
385-part stop locating feature;
387-double dovetail;
510-grip; and
1000-work piece.

DETAILED DESCRIPTION OF THE INVENTION

The present invention provides an exemplary modular machine vise.

Referring to FIGS. 1-7 and the exemplary modular vise 100 for clamping a work piece for use on a machine tool's working surface depicted therein; the modular vise 100 of the present invention comprises a fixed body 110, a moveable body 120, and a fixture plate 190. The moveable body 120 is comprised of a stationary block 130, master jaw 180, bevel gear set 140, lead screw 150, at least one guide rod and more preferably at least two guide rods and yet more preferably two guide rods 160, and dovetail clamps 170. The stationary block 130 of the moveable body 120 acts as a housing 142 for the bevel gear set 140 and bushing housing 162 for the at least one guide rod 160. The stationary block 130 also includes provisions for mounting an additional vise jaw 184, doubling the functionality of the moveable body 120 to act as a fixed body for clamping a second work piece against. In the preferred embodiment the provisions for mounting the additional vise jaw 184 is in the form of a dovetail groove 132, one or more alignment dowels 172, and one or more dovetail clamps 170. The master jaw 180 has the same dovetail groove 132, alignment dowels 172, and dovetail clamps 170 for mounting to vise jaws 184. The at least one guide rod 160 and lead screw 150 are rigidly affixed to the master jaw 180. The bevel gear set 140 is preferably comprised of two bevel gears oriented at a 90 degree angle relative to each other. The driven bevel gear 145 in the set is threaded to act on the lead screw 150. A driving feature such as an internal hex 146 is cut into the drive bevel gear 144 to allow the user to tighten the vise. The bevel gears are preferably inserted into tight tolerance bores 141 in the stationary block, acting as a bearing for radial movement. Alternatively a bearing or bushing could be inserted into the stationary block 130 for the bevel gears to ride in. In the preferred embodiment depicted, the bevel gears are constrained axially by a driven gear retaining ring 143 and a drive gear retaining ring 147 respectively and ride on thrust washers 148 on each side of the housing 142. It is preferrable for the driven gear retaining ring 143 to be a spiral wound retaining ring which is wound counter to the threading of the lead screw. Alternatively the driven gear retaining ring 143 may be a heavy duty snap ring or replaced with a nut that is threaded counter to the threading of the lead screw or alternatively retained via well know means. Alternatively, in another embodiment not depicted, the bevel gears ride directly on the housing or in thrust roller bearings. In the preferred embodiment depicted in FIG. 1, the stationary block is split, allowing the drive gear to ride in a separate plate that is in turn fastened to the rest of the stationary block completing the bevel gear housing. This splitting of the stationary block is to provide easier assembly of the gearset inside the moveable body. The lead screw 150 is rigidly attached to the master jaw 180. In the preferred embodiment depicted in FIG. 1 the lead screw 150 is welded to the master jaw 180 however as those skilled in the art are aware it may be bolted to, threaded into, or rigidly secured to the master jaw by any other readily available means.

The stationary block 130 of the moveable body 120 shall contain at least one and preferably two or more holes 134 to facilitate bolting or clamping to the fixture plate as well as at least one and preferably two or more locating features to precisely align the moveable body 120 with the fixture plate 190. In the preferred embodiment depicted in FIG. 1 this is accomplished by two holes 136 through the stationary block, counterbored at the top to allow flush bolting with SHCS. The holes are also counterbored on the bottom with tight tolerance holes 134, to allow placement of at least one hollow alignment dowel 137 and preferably at least two hollow alignment dowels and more preferably two alignment dowels that match up with corresponding counterbored holes 192 in the fixture plate 190. The fixture plate further has fixture plate clamping bores 196, 197 to allow for clamping the fixture plate 190 to the tool work surface.

The fixed body 110 closely resembles the stationary block 130 of the moveable body 120, though lacking the bores for guide rods and pockets for bevel gears. Therefore the fixed body 110 is preferably a block with the same dovetail groove 132, at least one alignment dowel 172 and preferably at least two hollow alignment dowels and more preferably two alignment dowels, and dovetail clamps 170 as both the master jaw 180 and stationary block 130 of the moveable body 120, as well as the one or more holes 136 to facilitate bolting or clamping to the fixture plate 190 as well as one or more location features to precisely align the moveable body with the fixture plate. As those skilled in the art are aware, changing the dovetail groove, alignment dowels, dovetail clamps, or holes do not avoid the teachings of the present invention. Again, similar to the stationary block 130 of the moveable body 120, the fixed body 110 in the preferred embodiment contains at least one counterbored through hole 136 for SHCS and at least one precision counterbore 134 on the bottom for hollow alignment dowels. In an alternative embodiment, the fixed body incorporates the same provisions described previously for mounting a vise jaw on the back of the fixed body onto the front of the fixed body, to allow mounting of two vise jaws wherein two movable bodies may act against the same fixed body. In yet another alternative embodiment, the same provisions described previously herein for mounting a vise jaw are placed on the top of the fixed body, to allow rapid and accurate machining of the front face of a vise jaw.

The at least one guide rod 160 is preferably a tight tolerance rod of any shape, more preferably round for ease of manufacture of the stationary block 130 of and the master jaw 180 of the moveable body 120. In the preferred embodiment depicted in FIGS. 3A and 4, the at least one guide rod 160 is tapped at one end to allow bolting 164 to the moveable jaw, however as those skilled in the art are aware the guide rods may alternatively be welded or rigidly secured to the master jaw by any other readily available means.

The lead screw 150 is preferably rigidly attached to the master jaw 180 and may be any screw that creates movement of the master jaw 180 when the bevel gear set 140 is rotated. In the preferred embodiment the lead screw 150 is Acme thread to reduce friction due to high axial loads on the screw while tightening the vise.

Figure 2A:
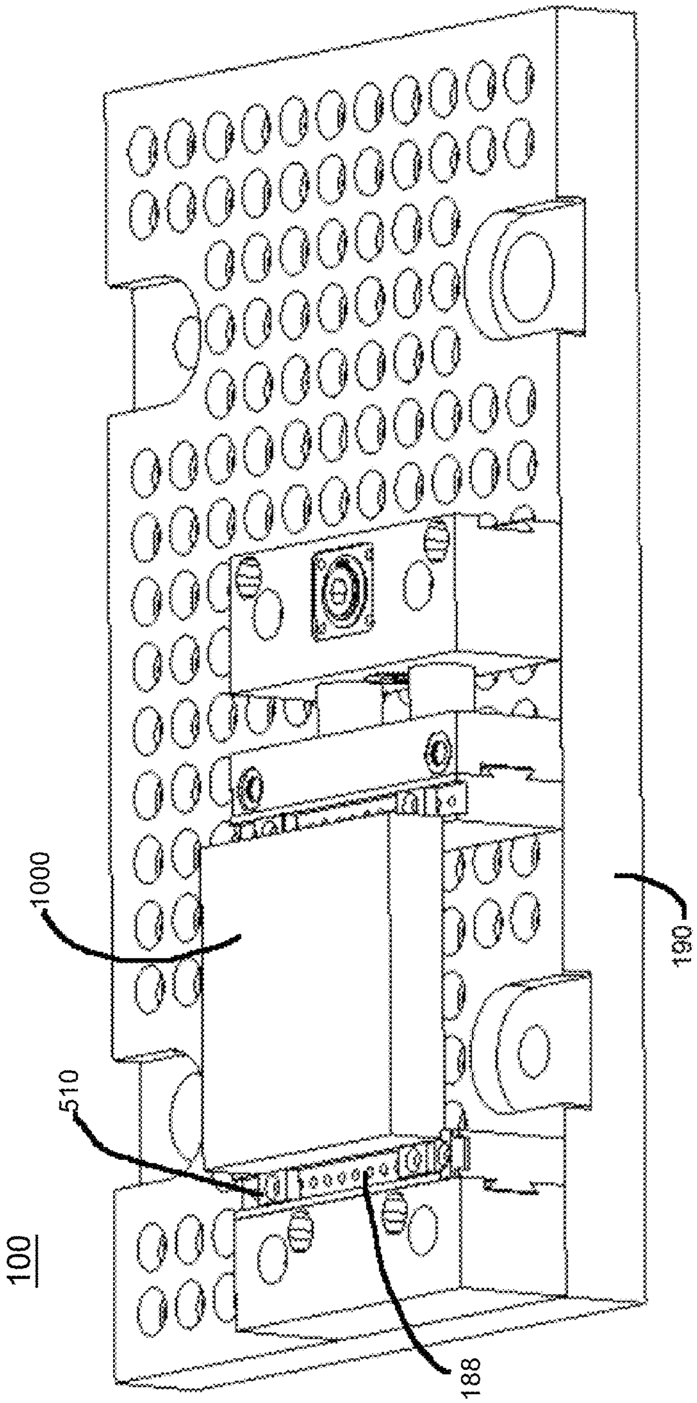
FIG. 2A is an isometric view of an exemplary modular vise of the present invention in use holding a part to be machined.
Figure 2B:
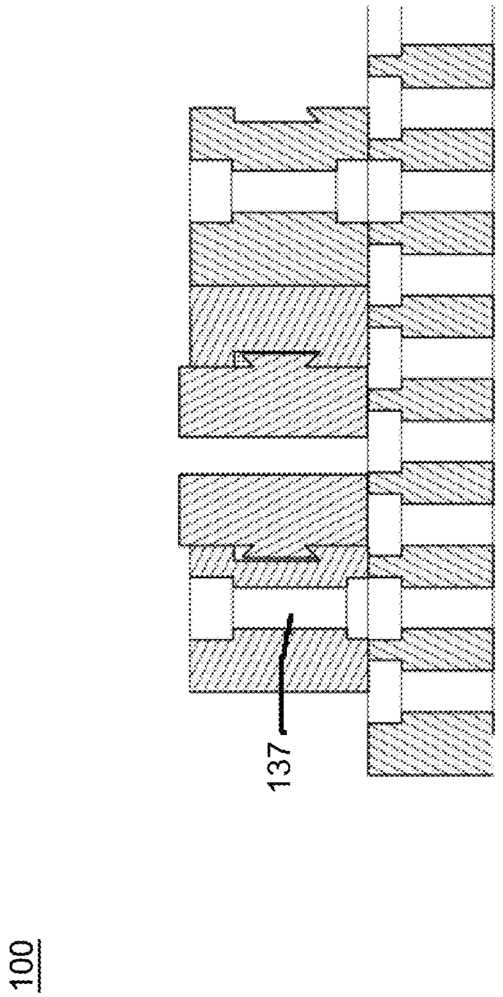
FIG. 2B is a wireframe side view of an exemplary modular vise of the present invention in use.
Figure 3A:
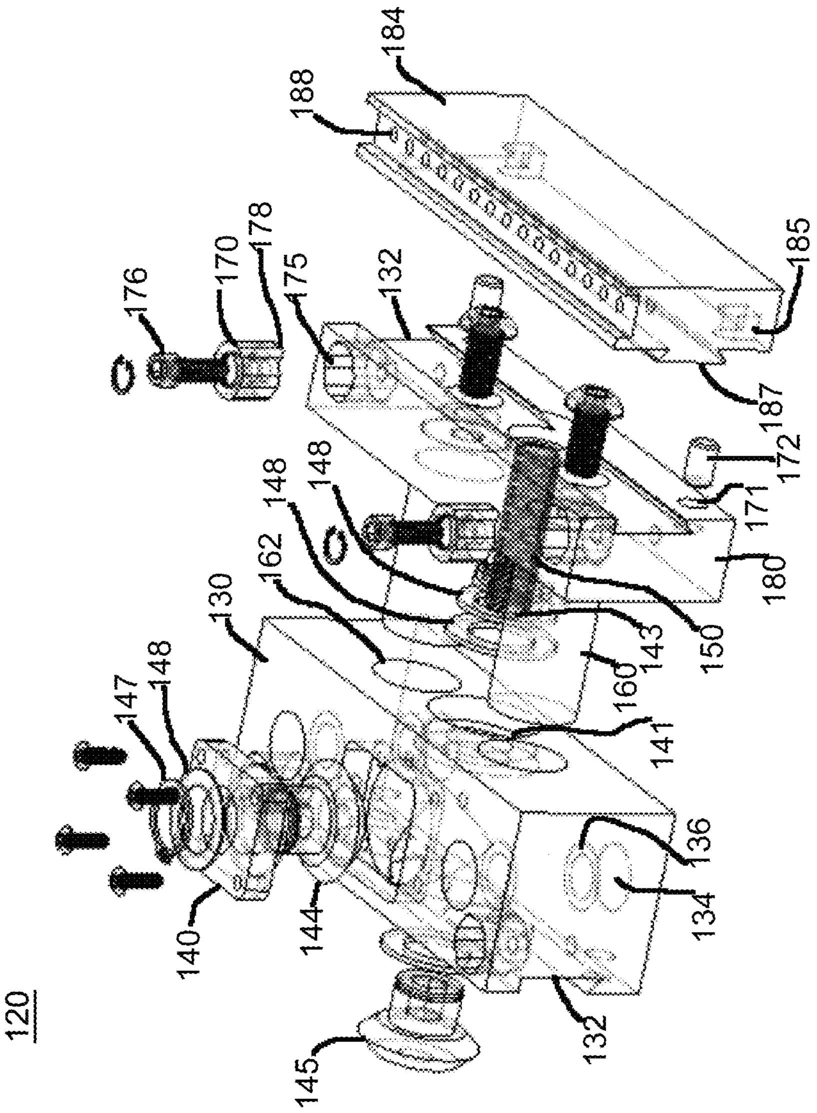
FIGS. 3A-C are exploded views of the components of the moveable body of an exemplary modular vise of the present invention.
Figure 3B:
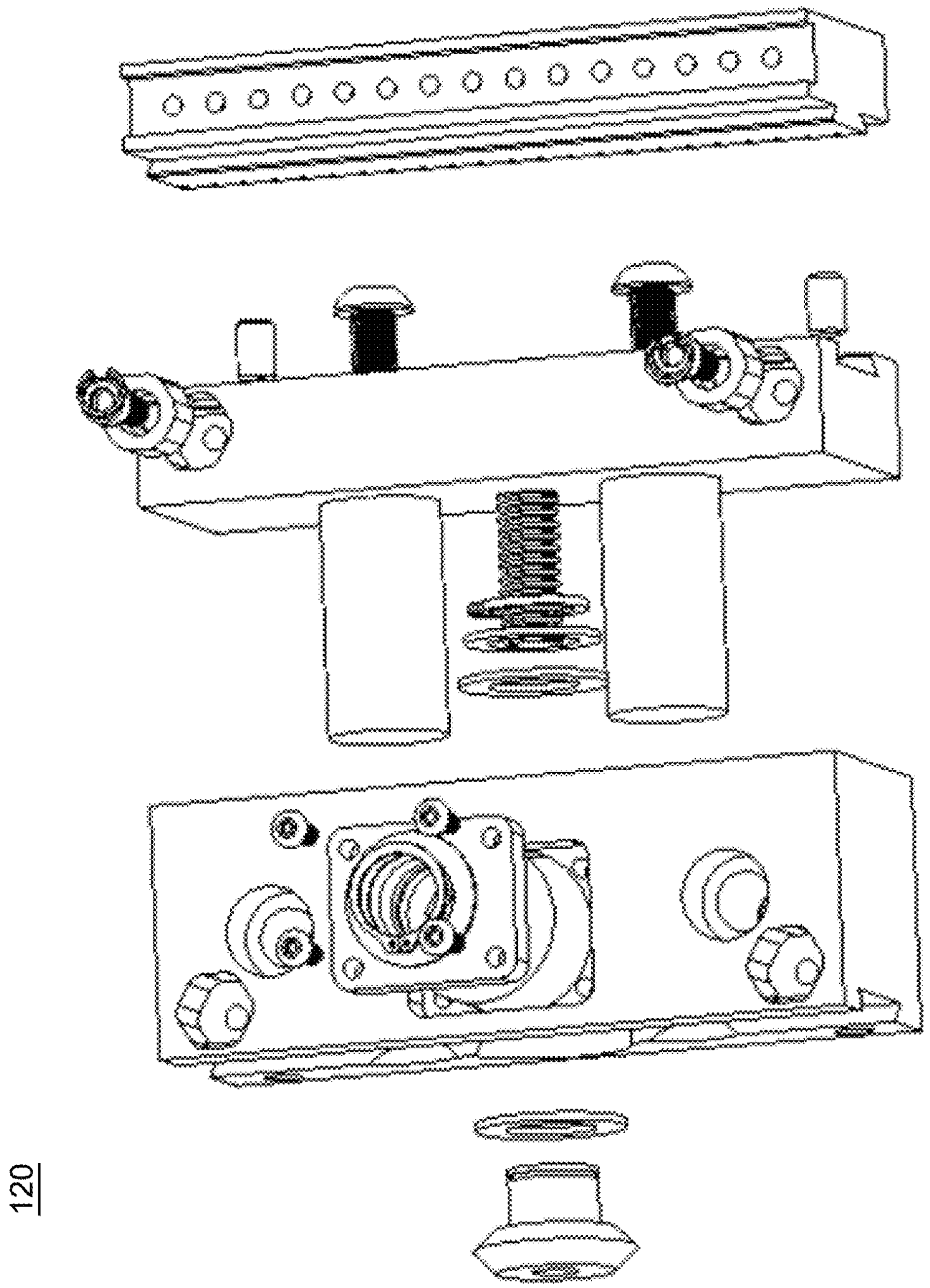
Figure 3C:
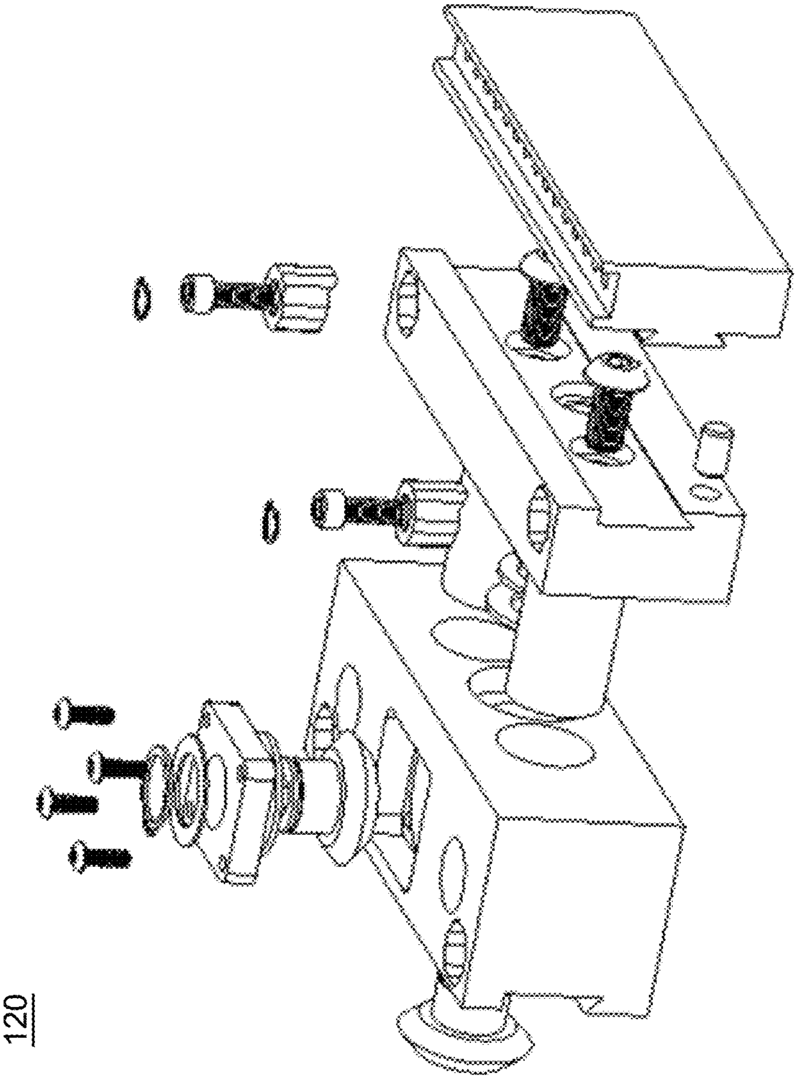
Figure 4:
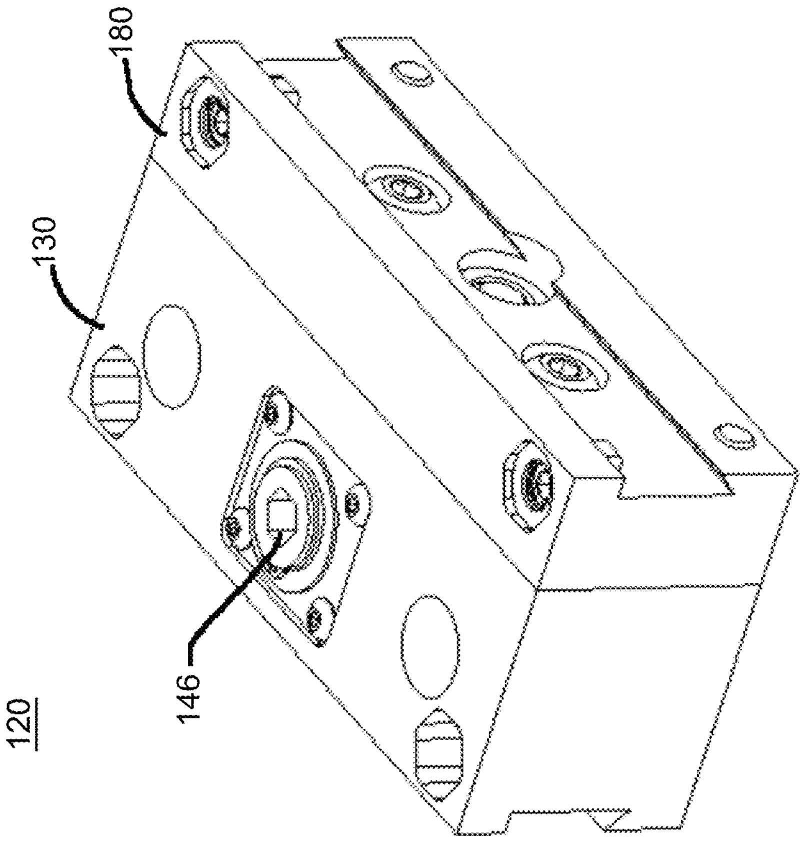
FIG. 4 is an isometric view of a moveable body of the exemplary modular vise of the present invention in an open position.
Figure 5:
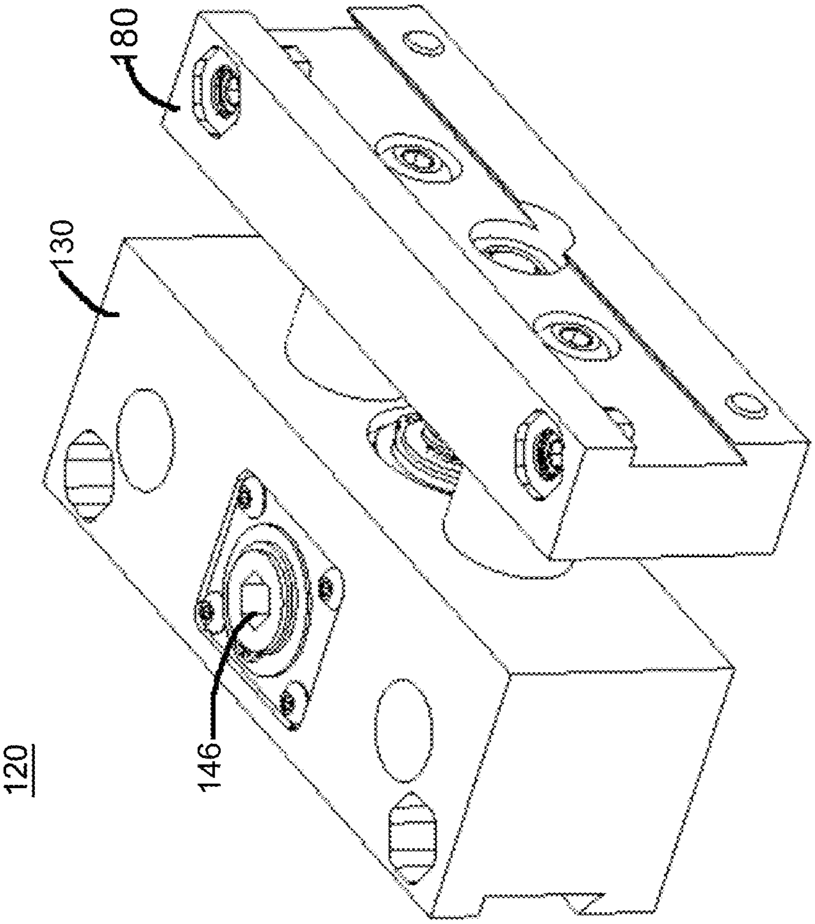
FIG. 5 is an isometric view of a moveable body of the exemplary modular vise of the present invention in a closed position.
Figure 6:
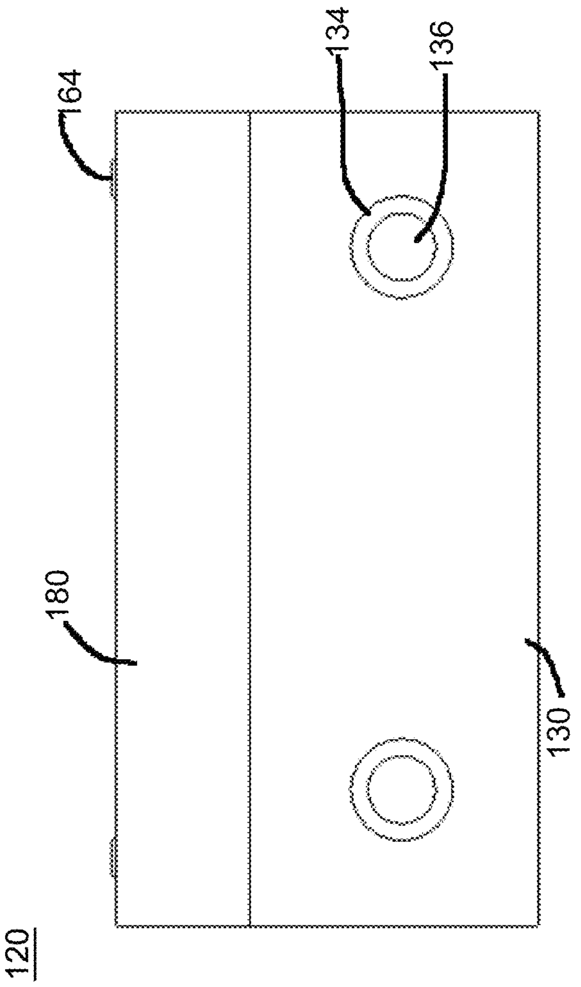
FIG. 6 is an underside view of an exemplary movable body of a modular vise of the present invention.
Figure 7:
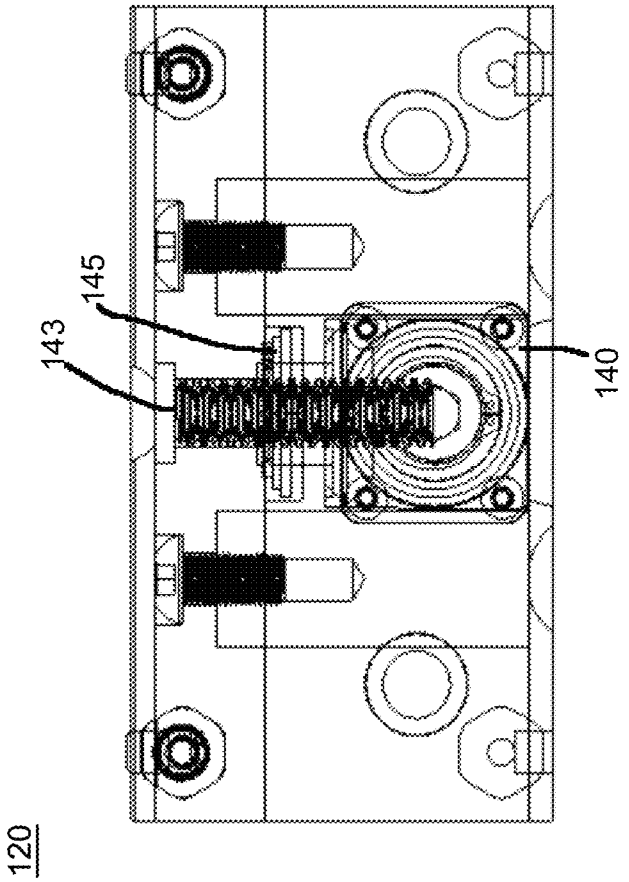
FIG. 7 is an underside view of a moveable body of an exemplary modular vise of the present invention provided in wireframe to highlight the interaction of the various components of the vise.

FIGS. 2A and 2B depict the modular vise 100 holding a work piece 1000. The work piece 1000 is held via grips 510 aligned in the mounting holes 188 located in the upper surface of the vise jaw 184. The vise jaw 184 preferentially has a double dovetail 187 along the face aligned towards the master jaw 180, stationary block 130, or the fixed body 110. Along that same face with the double dovetail 187, towards the bottom there is a channel 185 cut to allow for the vise jaw 184 to accept the alignment dowel 172.

Figure 8:
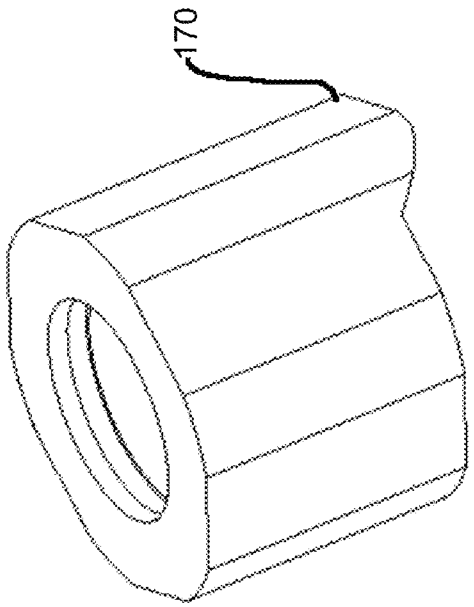
FIG. 8 is an isometric view of a dovetail grip of the present invention.

As depicted in FIG. 8, the dovetail clamps 170 are preferably a polygon or other shape that contains some feature to prevent rotation of the clamp while screwing into the fixed body 110, stationary block 130, or master jaw 180. The clamps preferably have a feature on the lower face such as a chamfered edged tooth 178 or the like to clamp the vise jaw against the back locating face of whichever body the jaw is being clamped to. In the preferred embodiment the clamps are hexagonal with rounded edges, to facilitate ease of machining of the receiving pockets in either vise body or master jaw. In the preferred embodiment, the clamps 170 have a through hole, with a counterbore and a retaining ring groove to facilitate installation of a SHCS 176 to both pull the clamps 170 down towards the vise body to clamp a jaw, and push the clamp 170 up out of the vise to facilitate easier removal of both the clamp 170 and the jaw. The clamps 170 have a chamfered edge protruding down from the lower face of the clamp, with a chamfer angle matching the dovetail of the vise jaw.

Referring again to FIGS. 1 and 2A-2B, the fixture plate 190 is any plate with patterned locating and retaining features to accept either the movable body 180 or fixed body 110 of the vise 100 in a multitude of locations and/or orientations. In the preferred embodiment the fixture plate 190 comprises a grid of tapped holes 192 to clamp the vise, each with concentric, precision counterbores to accept hollow alignment dowels for precise alignment of the vise 100. The spacing of the clamping and locating features in the fixture plate preferably repeat at an interval equal to or less than the total travel provided by the movable body of the vise to facilitate clamping of any size part or stock within the confines of the fixture plate without changing vise jaws.

The vise components may be made of any suitable engineering material such as stainless steel, steel, aluminum, titanium, or the like. Preferably a high stiffness, high hardness material such as steel will be used for the stationary block, master jaw, guide rods, bevel gears, fixed jaw, lead screw, fasteners and retaining rings. With bushings and bearings made of bronze, other copper alloy, or a similar suitable bearing material. If weight of the vise system becomes an area of concern, any of the parts may be substituted with a lighter material such as aluminum, titanium, brass, bronze, polymer, fiber reinforced polymer, compacted graphite, or similar material. Superficial pocketing to reduce weight of any components of the vise may also be performed.

Figure 9:
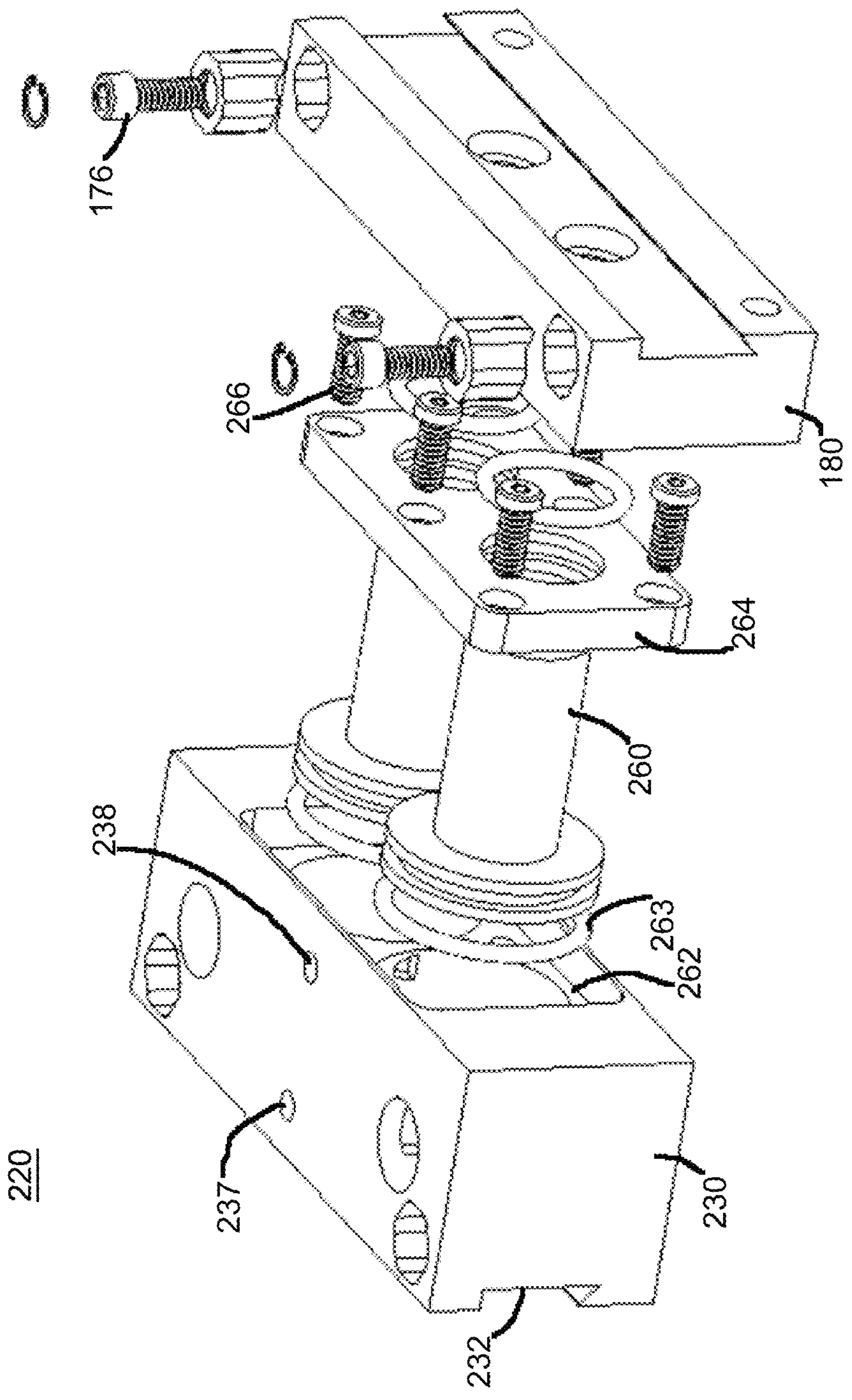
FIG. 9 is an isometric view of another embodiment of the exemplary modular vise of the present invention in which the opening and closing of the vise is driven hydraulically or pneumatically.

In another embodiment depicted in FIG. 9, a moveable block 220 of a modular vise is opened or closed via a hydraulic or pneumatic actuator. The bevel gear set and lead screw of the first embodiment of the present invention are replaced by a seal system incorporated to allow pneumatic or hydraulic cylinders to also function as guide rods. The hydraulic or pneumatic cylinder performs the clamping action of the vise. The hydraulic cylinders 260 each act as both a piston and a guide rod for actuating the vise. Hydraulic fluid (or compressed air) is introduced into the stationary block 230 via an inlet port 237 and is discharged through an outlet port 238. The hydraulic cylinders 260 each fit into a guide rod housing 262. A set of O-rings 263 maintain the seal between the hydraulic cylinders 260 and the guide rod housings 262. At the head of the cylinders is a seal housing plate 264 and an additional set of O-rings 263 complete the seal. The seal housing plate 264 is fastened to the master jaw 180 preferably by counter sunk screws 266 but other fastening methods may be used as those skilled in the art are aware.

Figure 10:
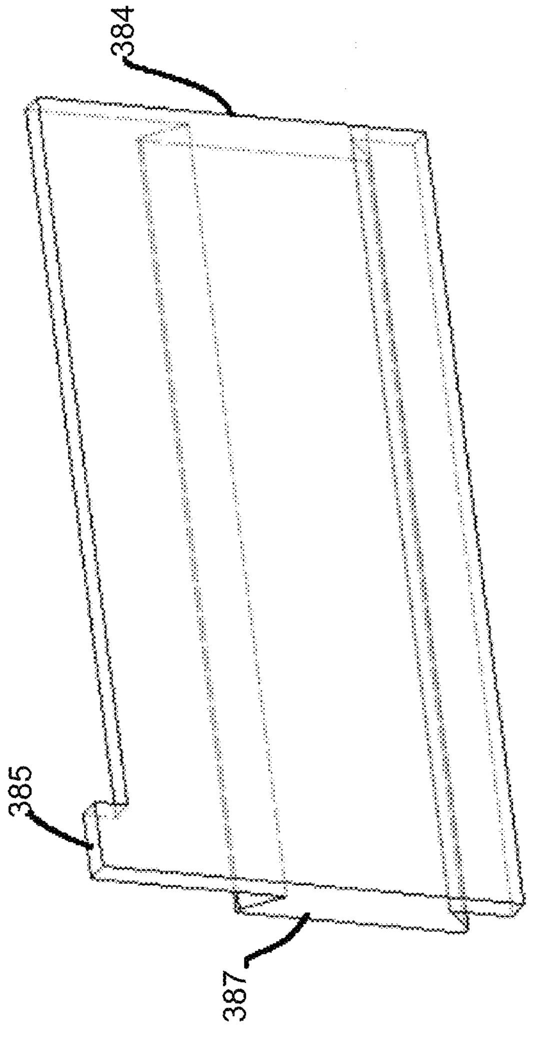
FIG. 10 is a view of a part stop of an embodiment of the present invention.

Another preferred embodiment of the modular vise is depicted in FIG. 10. In FIG. 10, a representative example of a mounting plate 388 with a protruding post 389 which provides for precisely placing a part within the modular vise. The mounting plate preferably has a double dovetail 387 for mounting to a master jaw, a stationary block, or a fixed body.

Figure 11:
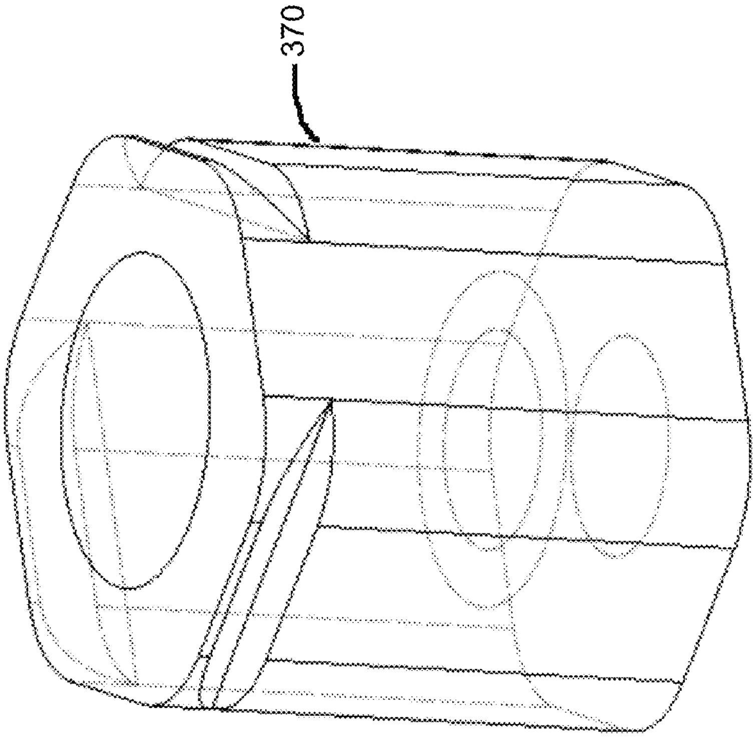

In yet another embodiment depicted in FIG. 11 a part clamping dovetail grip 370 to replace a simple dovetail clamp from the first embodiment is presented. The part clamping dovetail grip protrudes above the body of the vise to grip the workpiece and save space normally occupied by an attached jaw.

Figure 12:
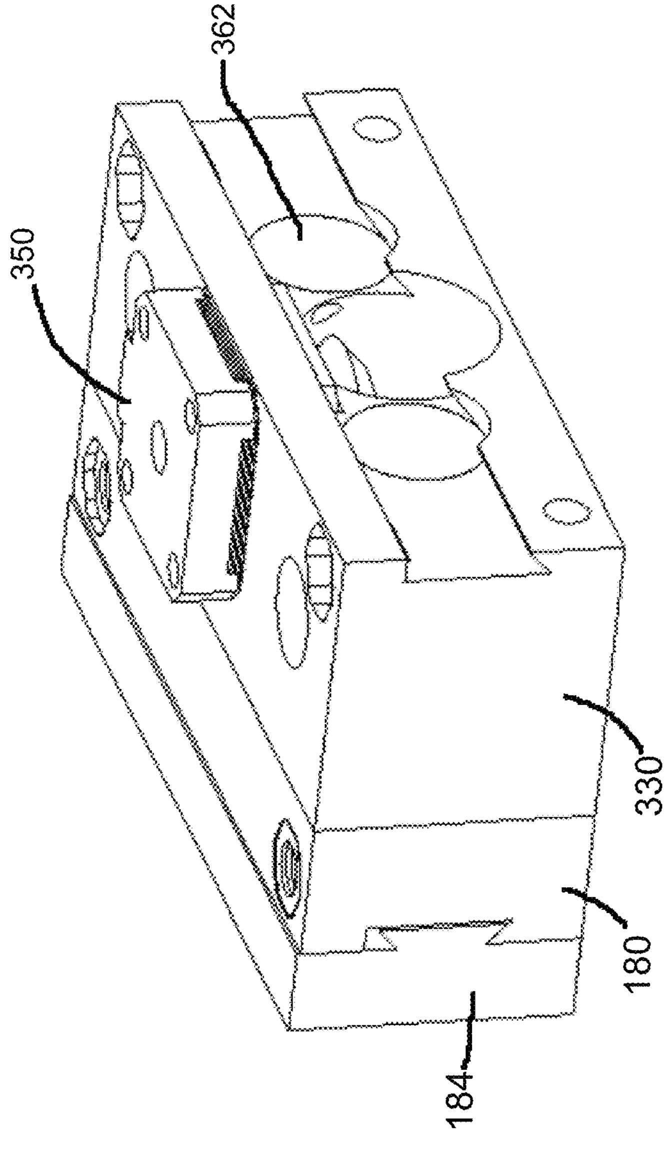
FIG. 12 is an isometric view of an exemplary electrically actuated modular vise of the present invention.

In yet another embodiment depicted in FIG. 12 the bevel gear set is replaced with a lead screw nut, not depicted, driven by an electric motor 350 to electrically actuate the vise. The electric motor may be connected directly to the nut or connected via an alternative type of drive train such as a worm, spur, bevel gear set, belt or chain drive, or the like. Unlike with the hydraulically or pneumatically actuated vise, the vise has at least one guide rod, not depicted, to direct the motion of the moveable body when opening or closing the vise. As with the mechanically actuated moveable body, the at least one guide rod is situated in the guide hole bore 362.

In yet another embodiment of the present invention, a worm drive acts upon the lead screw. The worm drive may be powered by any readily available means.

In yet another embodiment of the present invention, the lead screw of the first embodiment is replaced with a rack and the bevel gear system is replaced with a pinion. The rotation of the pinion controls the movement of the rack allowing the modular vise to open and close.

In yet another embodiment of the present invention, the modular vise may be equipped with a dovetail rather than a mounting dowel and the fixture plate may be equipped with a grove to allow for rapid changeovers.

In yet another embodiment a key, groove, and set screw may be used to attach the modular vise to the fixture plate which also enables rapid changeovers.

As those skilled in the art are aware, the various embodiments of the present invention may be combined with readily available jaw configurations such as those that use Mitee Bite clamps, grips or other similar products.

Although several embodiments of the present invention, methods to use said, and its advantages have been described in detail, it should be understood that various changes, substitutions, and alterations can be made herein without departing from the spirit and scope of the invention as defined by the appended claims. The various embodiments used to describe the principles of the present invention are by way of illustration only and should not be construed in any way to limit the scope of the invention. Those skilled in the art will understand that the principles of the present invention may be implemented in any suitably arranged device.

I claim:

1. A moveable body of a modular vise compatible with mounting upon the working surface of a machine tool via a fixture plate, the moveable body comprising:

a stationary block;

a master jaw;

a means for actuating said master jaw; and a means for aligning and mounting said stationary block to the fixture plate;

wherein said means for actuating said master jaw simultaneously allows said stationary block to be a fixed body for at least one additional vise;

wherein said master jaw comprises a means for affixing at least one vise jaw;

wherein said stationary block additionally contains means for affixing vise laws; and wherein said means for actuating said master jaw further comprises a bevel gear set; a lead screw; at least one guide rod; wherein said bevel gear set further comprises a drive bevel gear and a driven bevel gear; wherein said drive bevel gear further comprises a driving feature, said driven bevel gear is threaded and said threaded driven bevel gear acts upon the lead screw.

2. The moveable body of claim 1 wherein said means for affixing at least one vise jaw comprises a dovetail groove, one or more alignment dowels, and at least one dovetail clamp.

3. The moveable body of claim 2 wherein means for aligning and mounting said stationary block to the fixture plate comprises at least one bolt hole and at least one precision counterbore at a bottom of the at least one bolt hole.

4. The moveable body of claim 3 wherein the at least one guide rod and the lead screw are rigidly affixed to the master jaw; and said stationary block further comprises a housing for said bevel gear set; said housing for said bevel gear set comprises a tight tolerance bore; said tight tolerance bore acting as a bearing; wherein each said at least one precision counterbore is filled by at least one hollow alignment dowel.

5. The moveable body of claim 1 wherein said drive bevel gear is oriented along an axis other than the axis upon which said driven bevel gear is aligned.

6. The moveable body of claim 5 wherein said orientation of the drive bevel gear provides means for tightening said vise while said means for tightening said vise simultaneously allows said stationary block to be a fixed body for the at least one additional vise, and wherein the means for tightening is the driving feature which is an internal hex cut into the drive bevel gear.

7. The moveable body of claim 6 wherein said drive bevel gear is oriented along an axis perpendicular to the axis of said driven bevel gear.

8. A modular vise comprising: at least one fixed body; at least one moveable body; and a fixture plate wherein the at least one moveable body comprises the moveable body of claim 4.

9. The modular vise of claim 8 wherein said at least one fixed body comprises a means for mounting and aligning to the fixture plate; a means for affixing at least one vise jaw, further wherein said means for aligning and mounting said at least one fixed body to said fixture plate comprises at least one hole and at least one precision counterbore and said means for affixing vise jaws further comprises at least one dovetail groove, at least one alignment dowel and at least one dovetail clamp; wherein said fixture plate comprises a rigid plate, said rigid plate comprising patterned features for locating and retaining the at least one moveable body and the at least one fixed body.

10. The modular vise of claim 9 wherein the at least one moveable body, the at least one fixed body, and the stationary body are comprised of an engineering material.

11. The modular vise of claim 10 wherein the engineering material is selected from steel, stainless steel, aluminum, titanium, brass, bronze, polymer, fiber reinforced polymer, or compacted graphite.

12. The modular vise of claim 11 wherein the bearings are comprised of bronze or other copper alloy.

13. A moveable body of a modular vise compatible with mounting upon the working surface of a machine tool via a fixture plate, the moveable body comprising:

a stationary block;
a master jaw;
a means for actuating said master jaw; and
a means for aligning and mounting said stationary block to the fixture plate;
wherein said means for actuating said master jaw simultaneously allows said stationary block to be a fixed body for at least one additional vise;
wherein said master jaw comprises a means for affixing at least one vise jaw;
wherein said stationary block additionally contains means for affixing vise jaws; and
wherein said means for actuating said master jaw further comprises: at least one piston; at least one piston bore; at least one guide rod bore; at least one guide rod, and a port for transfer of fluid to act on said piston.

14. The moveable body of claim 13 wherein said means for actuating said master jaw further comprises a set of hydraulic pistons, O-rings, and a seal housing; said stationary block further comprises a housing for said hydraulic pistons; said housing for said hydraulic pistons comprises a tight tolerance bore; said tight tolerance bore and hydraulic pistons are sealed via said series of O-rings; said set of hydraulic pistons additionally functioning as guide rods.

15. A moveable body of a modular vise compatible with mounting upon the working surface of a machine tool via a fixture plate, the moveable body comprising:

a stationary block;
a master jaw;
a means for actuating said master jaw; and
a means for aligning and mounting said stationary block to the fixture plate;
wherein said means for actuating said master jaw simultaneously allows said stationary block to be a fixed body for at least one additional vise;
wherein said master jaw comprises a means for affixing at least one vise jaw;
wherein said stationary block additionally contains means for affixing vise jaws; and
wherein said means for actuating said master jaw further comprises a lead screw, an electric motor, a lead screw nut; a drivetrain; and at least one guide rod wherein the drivetrain transfers the motion of said electric motor to the nut.

16. A modular vise comprising: at least one moveable body; at least one fixed body; and a fixture plate wherein the at least one moveable body comprises the moveable body according to claims 1, 13, or 15.

17. The modular vise of claim 16 wherein said at least one fixed body comprises a means for mounting and aligning to said fixture plate and a means for affixing at least one vise jaw.

18. The modular vise of claim 17 wherein said means for aligning and mounting said at least one fixed body to said fixture plate comprises at least one hole and at least one precision counterbore and said means for affixing vise jaws comprises at least one dovetail groove, at least one alignment dowel and at least one dovetail clamp; wherein said fixture plate comprises a rigid plate, said rigid plate comprising patterned features for locating and retaining the at least one moveable body and the at least one fixed body.

* * * * *